March 25, 1930.   B. B. HOLMES   1,751,479
SHOCK ABSORBER
Filed July 27, 1927
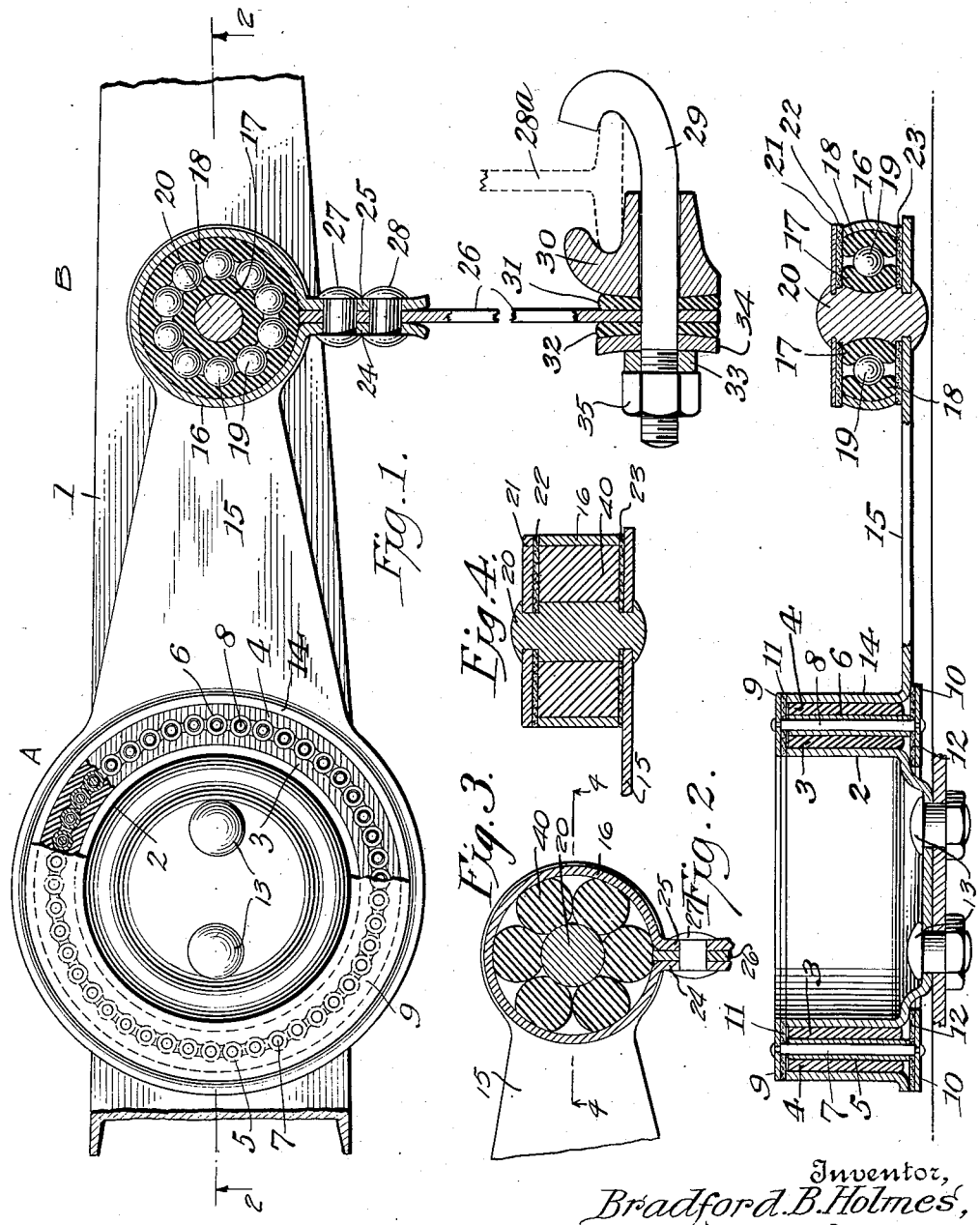
Inventor,
Bradford B. Holmes,
By his Attorney Patented Mar. 25, 1930

1,751,479

UNITED STATES PATENT OFFICE

BRADFORD B. HOLMES, OF NEW YORK, N. Y., ASSIGNOR TO AMERICAN CHAIN COMPANY, INC., A CORPORATION OF NEW YORK

SHOCK ABSORBER

Application filed July 27, 1927. Serial No. 208,752.

This invention relates to shock absorbers and more particularly to improvements in the construction thereof.

The principal object of this invention is the provision of a shock absorber having rolling bearings therein which provide a retarding effect upon the parts of the device due to the work required to deform the resilient members of which the bearings are formed.

A further object is the provision of a rolling bearing for use in the shock absorber having resilient races and metal balls as bearing members. The resilient races are compressed in the bearings.

A still further object is the provision of a shock absorber which will have a universal action to allow for play or side movement between the body and springs without damage to the parts of the device.

Another object is the provision of a shock absorber which will require little, if any, attention or adjustment and will be easy to manufacture.

A clear conception of the construction and further objects of the invention may be had from the following specification in conjunction with the accompanying drawings in which:

Fig. 1 discloses the invention in plan view partly in cross-section.

Fig. 2 is a cross-section through 2—2 of Fig. 1.

Fig. 3 shows a modified form of one of the members in plan view.

Fig. 4 is a cross-section through 4—4 of Fig. 3.

Figs. 1 and 2 show the automobile shock absorber using a rolling bearing having a series of resilient races and metal balls or rollers as bearing members. The shock absorber comprises an arm 15, having bearings A and B, the former using rollers and the latter balls, as rolling members. One end of the arm 15 is fastened to the automobile frame 1 by means of the rolling bearing A using rollers, while the other end of the arm 15 is free to oscillate around the axis of the bearing A. Mounted on the free end of the arm 15 is the bearing B using balls, which is connected to the axle 28ª of the automobile by means of a metal strap 26.

The rolling bearing A comprises a cup-shaped member 2 bolted to the frame 1 by means of bolts 13. The arm 15 is formed with a cylindrical end portion 14, of a larger diameter than the cup-shaped member 2, and surrounding the latter. Between the members 2 and 14 are inner and outer races 3 and 4 of rubber, leather, or other suitable resilient material, between which races are forced or embraced closely, a plurality of rollers such as 5 and 6 mounted on shafts 7 and 8 in a cage formed by annular rings 9 and 10, and at the end faces of cylinders 2 and 14 are fibre washers 11 and 12 which act as bearing surfaces for the roller cage. The race members are formed wider than the member 2 so that when assembled the races are compressed by the rings 9 and 10.

The bearing B is composed of a piece of strap metal 16 formed in a cylinder shown in Fig. 1, with its ends 24 and 25 drawn out to form a connection portion for strap 26. The cylinder 16 is preferably curved outwardly in its central portion as shown in Fig. 2. Cylinder 16 encloses inner and outer races 17 and 18 of resilient material, between which are closely embraced a plurality of balls 19. The race 18 is wider than the strap 16 so that the rubber is placed under compression when the plate 21 is secured in place by a rivet 20.

This whole structure B is mounted on the arm 15 by means of rivet 20, which forms a central shaft for the bearing. The rivet 20 is preferably shaped as shown in Fig. 2, with shoulders which hold washers 22 and 23 preferably formed of fibre and the end plate 21. The rivet 20 provides a pivot for the bearing B.

Strap 26 is riveted to the connector portions 24 and 25 by rivets 27 and 28, and the other end is connected to the axle 28ª by means of a hook bolt 29 which engages one side of the flanged axle 28ª and has a clamping member 30, which engages the opposite side flange of axle 28ª. Bolt 29 passes through a suitable hole in a strap 26 and has resilient washers 31 and 32 spaced on each side of strap 26 with a lock washer 33 and metal plate 34 retained in place by a nut 35.

Due to the rubber races in the bearing B there is a considerable amount of universal movement between the arm 15 and the casing 16 of the bearing thereby allowing for any ranging movement of the axle which would occur when the wheels on one side of the vehicle strike a bump and the wheels on the other do not. This universal movement prevents the bearing B from being damaged. There is a further universal movement provided in the structure adapted for securing the axle 28ª to the strap 26. This movement is facilitated by the resilient members 31 and 32 which are of such a structure that they will allow a considerable twisting movement in the strap which might be caused by the action described above.

It is apparent that either bearing A or B may have one or more of its races vulcanized to the adjacent surfaces of the bearing or shaft without departing from the scope of the invention.

A modified form of bearing B is shown in Figs. 3 and 4. As the structure is similar to that of bearing B, the same designating numerals will be used, the only material difference being that the cylinder 16 and bolt 20 have straight walls rather than the curved type shown in Fig. 2, also a plurality of rubber rollers such as 40 are used to replace the rubber races and metal balls as rolling members. The rollers are of such a width that they are compressed by the end plates. It will be seen from this that any of these types of rolling bearings may be used in this structure and that they are interchangeable at will.

It is obvious that this type of bearing is more readily adapted for use as a universal joint than the one described above. This is due to the fact that there are no metal balls to interfere with the twisting of the rubber rollers.

The automobile shock absorber operates in the following manner:

When the vehicle passes over an elevation in the road, the axle 28ª rises toward frame 1, forcing bearing B upward and thereby causing arm 15 to rotate about bearing A in a counter-clockwise direction, the bearing B having a clockwise rotative movement about the rivet 20, and the rolling members 19 of the bearing B are forced into their races thereby deforming them and resisting the turning of the parts. The friction and energy absorbed by the deformation of the races is sufficient to retard their rotative movement, thereby snubbing or slowing the movement of the axle toward the frame.

At the same time the rotation of part 14 around the cup 2 causes the resilient rings 3 and 4 to be deformed by the rollers 5 and 6 against the resistance caused by the closely embracing fibre washers 11 and the contacting inner surfaces of the annular members 2 and 14.

As the axle rebounds from the frame under the influence of the vehicle springs, the rolling bearing members A and B will again retard rotative motion owing to the friction and deformation of the resilient members.

It is apparent that this type of shock absorber will not require a great deal of attention or adjustment, and that it is a structure that will be simple to manufacture.

I claim:

1. A shock absorber having rolling bearings as retarding elements, said bearings comprising a plurality of race members of resilient material and a plurality of metal rolling members cooperating therewith, said races being under compression.

2. In a shock absorber, an arm having a rolling bearing on each end, one of said bearings being affixed to the frame of a vehicle, the other of said bearings being connected to the axle of said vehicle by a metal strap, said bearings having retarding elements in the form of a set of race members and a set of rolling members, one of said sets being of a resilient material and under compression.

3. In a shock absorber, an arm having a rolling bearing formed integral with one end thereof, and a second rolling bearing secured to the other end of said arm, said first bearing comprising a pair of rubber races having a plurality of metal rollers forced therebetween; said second bearing comprising a pair of rubber races with a plurality of metal balls forced therebetween, all of said races being under compression, said first bearing being secured to the frame of a vehicle, said second bearing being connected to the axle of said car by a metal strap and said bearings retarding the movement of said axle with respect to said frame by the resistance due to the deformation of said races.

4. In a shock absorber, an arm having a rolling bearing formed integral with one end thereof and a second rolling bearing secured to the other end of said arm, said bearings having resilient members therein, under compression, said first bearing being secured to the frame of a vehicle, said second bearing being secured to the axle of said vehicle by a strap, said resilient members retarding the movement of said axle toward and away from said frame by the deformation of said members to permit a universal action in the parts thereof.

In testimony whereof, I have signed this specification.

BRADFORD B. HOLMES.